(12) United States Patent
Grimbergen

(10) Patent No.: US 6,534,756 B1
(45) Date of Patent: Mar. 18, 2003

(54) ULTRA-STABLE, COMPACT, HIGH INTENSITY FIBER-COUPLED LIGHT SOURCE FOR USE IN MONITORING AND PROCESS CONTROL

(75) Inventor: Michael N. Grimbergen, Redwood City, CA (US)

(73) Assignee: Applied Materials INc., Santa Clara, CA (US)

( * ) Notice: Subject to any disclaimer, the term of this patent is extended or adjusted under 35 U.S.C. 154(b) by 130 days.

(21) Appl. No.: 09/602,619

(22) Filed: Jun. 22, 2000

(51) Int. Cl.[7] .................................................. G01J 1/32
(52) U.S. Cl. ........................................ 250/205; 250/239
(58) Field of Search ............................ 250/205, 214 R, 250/239, 204, 201.1, 227.22; 362/16; 438/57; 257/80–82, 431–435

(56) References Cited

U.S. PATENT DOCUMENTS 3,457,454 A    7/1969  Boland ........................ 315/115
5,536,943 A *  7/1996  Smith et al. ................. 250/372
5,811,211 A *  9/1998  Tanaka et al. ................ 430/30
5,834,908 A   11/1998  Boland et al. ............... 315/307

* cited by examiner

Primary Examiner—Robert H. Kim
Assistant Examiner—Irakli Kiknadze
(74) Attorney, Agent, or Firm—Roberts Abokhair Marudla; Joseph Bach

(57) ABSTRACT

Mounting source components in a single piece machined housing block enhances stability of operation of a vapor lamp light source. Additionally, the light path providing sample light to a reference detector is matched to have the same numerical aperture as the optical fiber bundle used to output the light from the source. By matching the feedback optical path and the output optical path, more accurate, sensitive feedback control is made possible. Brightness of output of the light source is maximized by placing the vapor lamp as close as possible to the output fiber bundle. An output node provides a signal indicative of operational status of the light source, for use by a process controller.

18 Claims, 4 Drawing Sheets

ULTRA-STABLE, COMPACT, HIGH INTENSITY FIBER-COUPLED LIGHT SOURCE FOR USE IN MONITORING AND PROCESS CONTROL

BACKGROUND OF THE INVENTION

1. Field of the Invention

The present invention relates generally to the field of illumination. More particularly, the present invention relates to vapor-filled or gas-filled lamps for analytical instrumentation, such as interferometric endpoint detectors for use in semiconductor processing machinery.

2. Background Information

The manufacture of semiconductor devices uses many types of operations including etching, deposition, heating, ion implantation, and polishing. These operations are generally automated and are performed inside vacuum chambers under controlled conditions. Of course, sensors are necessary to carry out automated control of these operations.

Most modern etching equipment make some provisions for endpoint detection, i.e. detection of etch-through in a desired layer. One approach that is useful with transparent and semi-transparent layers (one example being silicon dioxide ($SiO_2$)) is to use the principles of light interferometry. With light interferometry, a beam of light having some degree of coherence (laser or other light source that is at least short-term coherent) is directed at the layer being etched and a reflected portion of the beam is detected by an appropriate photodetector. Some of the incident beam will be reflected from the top surface of the layer and some of the beam will be reflected from the bottom surface of layer. These two reflections will either constructively or destructively interfere with each other, creating a characteristic etching curve (typically periodic) as the layer is etched away. When the etching curve changes or flattens out, the layer has been etched through and endpoint has been detected.

Rather than waiting for the curve to flatten out, a more sophisticated method (often used for etch of polysilicon) anticipates the endpoint by counting the number of oscillations of the sinusoidal etch curve (corresponding to the interference fringes) and stops the etching just short of the layer interface. This permits change over to use of a different mix of etch gasses to provide for a more discriminating etch at the end of the etch step.

A number of interferometric endpoint detection schemes have been devised, the above-described procedures being examples of many that are useful. A common feature of the interferometric techniques is the need for a coherent or partially coherent light source. In many instances, vapor lamp light sources are preferred over lasers. There are a number of reasons for this. Vapor lamp light sources are cheaper and more available than lasers and generally have a lower Mean Time Between Failure (MTBF). Additionally, a short-term coherent source is preferred over a long-term coherent source for some interferometric endpoint detection methods (such as those described above) for the reason that the less coherent source actually has the effect of isolating the parameters that are of interest and being relatively insensitive to noise parameters (e.g., movement of the wafer holder due to thermal effects).

Besides semiconductor process monitoring uses, mercury vapor lamps are also commonly used as stable light sources in the art of analytical instruments in general, particularly for providing light in the visible and ultraviolet ranges.

A stabilized vapor lamp light source is one that is engineered to provide light at a desired intensity and wavelength so that the intensity at the selected wavelength does not vary beyond a specified range of intensities. Stabilized light sources are useful in a wide range of analytical instrumentation applications. Analytical instruments that utilize a stabilized light source can optically detect anomalies in blood (such as AIDS), as well as concentrations of gaseous and metallic molecules and atoms (mercury, lead, arsenic, selenium, etc.), either as materials used in an industrial process or as environmental pollutants. These applications require that the lamps closely adhere to specified illumination intensity levels over time.

The presence of a metal in an environment is detected by observation of the amount of absorbence of spectral emissions from the same metal contained in the vapor lamp that occurs as the emissions pass through an optical cell containing atoms of this same metal. This arrangement has been used successfully for detecting and measuring very small quantities of mercury, zinc, and cadmium. The reason that sources incorporating these metals are utilized is that they operate within very broad thermal operating conditions.

Mercury vapor lamps (as well as those containing zinc or cadmium) are standard sources of ultra violet light and have evolved to the extent that they are reliable in maintaining the output level (i.e., the illumination intensity). This has been accomplished by a combination of improvements including mounting a lamp in an aluminum heat sink block so that the ambient conditions do not influence the temperature of the lamp itself, because temperature variations can otherwise influence the output level of the lamp. Another means for stabilizing the output has been to regulate the current through the lamp.

A stable light source, such as a mercury vapor lamp, has been positioned within a metal block, with a heater for the metal block, and a heater control for maintaining the temperature of the block constant. Light sources embodied according to this configuration are capable of maintaining a stable intensity at 254 nm of about ±0.25 percent. For additional information on light sources of this sort, refer to U.S. Pat. No. 3,457,454 to Boland. The Boland '454 reference is incorporated herein by reference in its entirety for all purposes.

A stable light source, such as a mercury vapor lamp, has also been positioned within a metal block, with a heater for the metal block, and a control system that regulates not only heat but also current level supplied to the lamp. The control system includes an optical loop with a sensor to detect light output by the lamp and passing through a filter. Light sources embodied according to this configuration are capable of maintaining a stable intensity of better than 0.2 percent maximum peak-to-peak variation. For additional information on light sources of this sort, refer to U.S. Pat. No. 5,834,908 to Boland et al. The Boland '908 reference is incorporated herein by reference in its entirety for all purposes.

In laboratory uses of instruments utilizing mercury vapor lamps (filled with Hg alone or Hg mixed with various other fill gasses) there is always a need by the end user for higher intensity outputs at specific wavelengths, and for close control of the relative intensity of the mercury and gas fill spectral line emissions.

Thus, what is needed is a light source having stability performance that exceeds that possible with known vapor lamp sources.

In particular, the vapor lamp stability controls according to the prior art are not suitable for providing precise control of output light intensity when the output light is coupled via a light guide such as an optical fiber bundle. That is because the optical sensor senses light according to a numerical aperture that is different from the numerical aperture at the end of the light guide where the output light is coupled into the light guide. This mismatch of numerical apertures between the light guide and the feedback sensor causes the feedback signal to be insensitive and/or inaccurate.

Thus, what is also needed is a vapor lamp light source that provides stable output intensity when the output is coupled via a light guide.

SUMMARY OF THE INVENTION

One feature of a light source according to the present invention is that its structure is very mechanically stable. Another feature is the use of accurate optical sampling to provide a sensitive feedback signal for the control system of the light source. Yet another feature is that the output light intensity of the light source is maximized.

It is an object of the present invention to provide a light source having stability performance that exceeds that possible with known vapor lamp sources.

It is another object of the present invention to provide a vapor lamp light source that produces high output from a compact package.

It is yet another object of the present invention to provide a vapor lamp light source that provides stable output intensity when the output is coupled via a light guide.

It is a further object of the present invention to provide a vapor lamp light source wherein a feedback light signal is sampled according to a numerical aperture that is the same as the numerical aperture of a light guide accepting the output of the light source.

It is a still further object of the present invention to provide a vapor lamp light source wherein a process controller is provided with a signal that indicates the status of the light source.

A further object of the present invention is to provide a way of controlling semiconductor fabrication processes to account for situations where a light source for a process monitoring instrument fails.

An additional object of the present invention is to provide a semiconductor processing system that incorporates an interferometric endpoint detection structure having an ultra-stable light source.

Some of the above objects are achieved by a light source having a substantially constant output level. The light source includes a unitary housing member having a light guide connection disposed at one end, and a vapor lamp positioned securely via the unitary housing member. A reflector is positioned securely via the unitary housing member to concentrate light output by the vapor lamp into the light guide connection. The light source also includes a reference detector positioned to receive a portion of the light output by the vapor lamp and generate a feedback signal, and a power supply connected to supply power to the vapor lamp in an amount controlled according to the feedback signal.

Others of the above objects are achieved by a light source having a substantially constant output level. The light source includes an optical fiber bundle having an end, a vapor lamp positioned near the end of the optical fiber bundle, and a reflector positioned to concentrate light output by the vapor lamp into the end of the optical fiber bundle. A beam splitter is positioned along a first optical path extending between the vapor lamp and the end of the optical fiber bundle. The light source also includes a reference detector to receive a portion of the light output by the vapor lamp and generate a feedback signal, the reference detector being positioned along a second optical path extending from the beam splitter angled away from the first optical path, wherein the second optical path is matched to the first optical path. A power supply connected to supply power to the vapor lamp in an amount controlled according to the feedback signal.

Some of the above objects are achieved by a monitoring method for use in a semiconductor fabrication process. The monitoring method includes a step of monitoring one or more parameters relevant to the fabrication process via a measurement instrument having a light source, as well as a step of monitoring a data output node of the light source for occurrence of an alert signal indicating the light source is in a failure mode. A signal perceivable by an operator is provided in the event that the alert signal occurs.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

Maximum light intensity is output from a light source embodied according to the present invention as a result of close coupling of a vapor lamp to a light guide, specifically, an optical fiber bundle. The fiber bundle couples the output light. In addition to maximized intensity, mechanical stability is achieved by securing the elements of the light source in a single machined part.

The single machined piece holds a mercury vapor lamp, a beam splitter to sample light output by the lamp, a curved reflector to concentrate the light, and a fiber optic bundle to carry the light. These elements are arranged in close proximity to one another so as to couple the maximum possible amount of light into the fiber bundle.

Stability of the light source is additionally promoted via an optical feedback path for controlling power to the lamp. Additional housing structure holds optical components (e.g., a lens) to provide a matched optical path for a reference detector. The reference detector provides feedback for a stabilizing control system. The optical components between the lamp and the reference detector are selected so as to ensure that the reference detector sees light from the lamp with the same F/# as does the fiber optic bundle. As a result, light from the same part of the lamp that illuminates the optical fiber bundle is used to generate the stabilizing feedback signal.

Another aspect of a light source according to the present invention is a temperature control system to maintain the lamp at a consistent temperature. This further adds to stability. Such a temperature control system is known in the art (refer to U.S. Pat. No. 5,834,908 discussed above) and is commercially available from BHK, Inc.

An additional aspect of the present invention is the generation of a data signal for output to a process controller. The fact of whether or not the light source is functioning correctly is important information. A process controller that controls an industrial process (e.g., manufacture of semiconductor articles) that relies on measurements provided by an analytical instrument, which incorporates the light source, has a vested interest in knowing whether the light source is functioning. If the light source is in a failure mode, the data provided by the analytical instrument containing the light source becomes unreliable and is unsuitable for accurate process control. Thus, operational status of the light source is an important parameter for consideration by the process controller's control algorithms.

One advantage of a light source according to an embodiment of the present invention is that over 50 µW of optical power (at 254 nm) is coupled into the optical fiber bundle with a controlled intensity of better than 0.1 percent.

Figure 1:
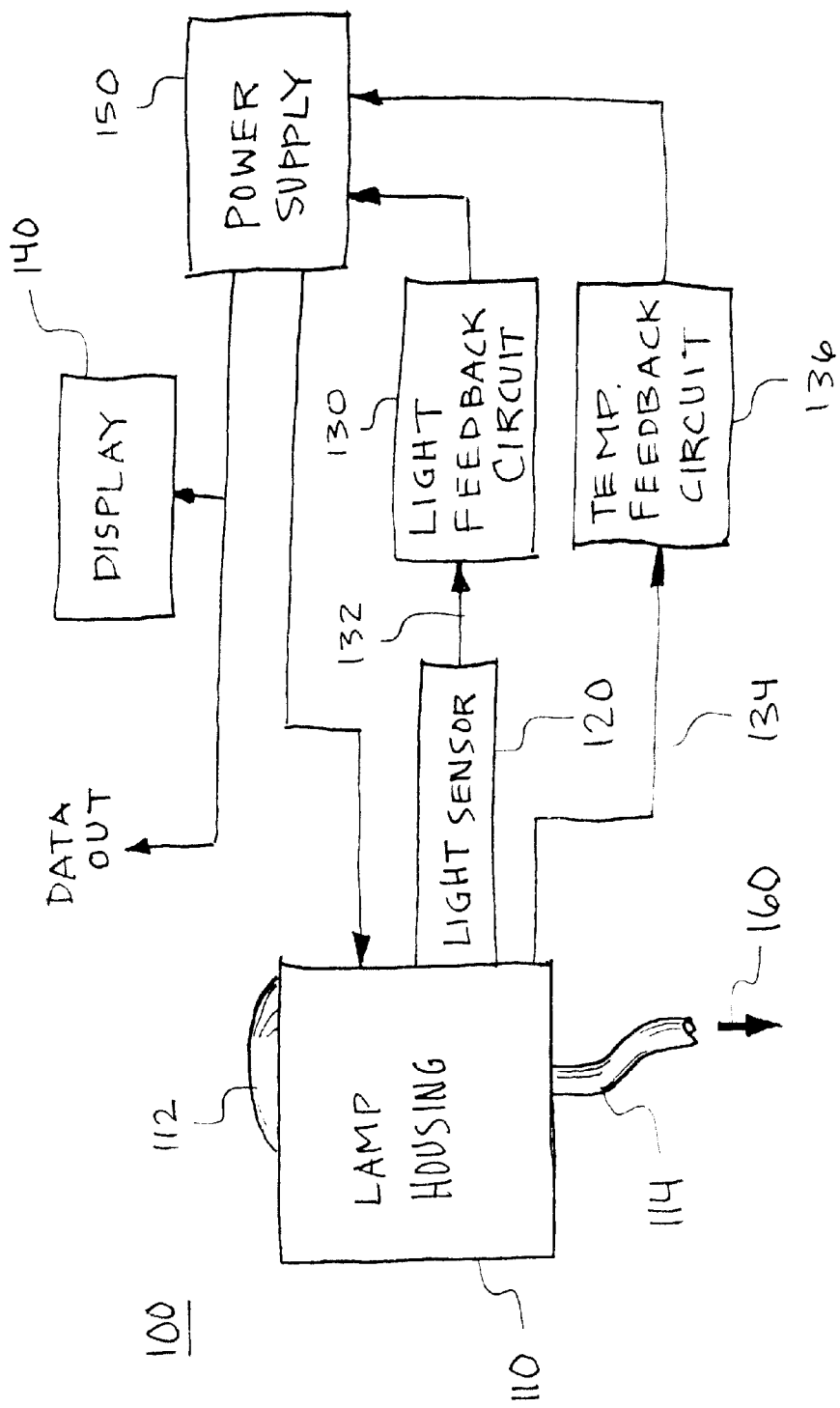
FIG. 1 illustrates a block diagram of a light source according to an embodiment of the present invention.

Referring to FIG. 1, a perspective view of a light source 100 according to an embodiment of the present invention is illustrated. A lamp housing 110 includes a unitary machined piece to hold internal components (lamp, beam splitter, etc.) stably. A curved reflector 112 is disposed atop the lamp housing 110. Light 160 is output via an optical fiber bundle 114.

The measurement optics assembly 120 generates an optical feedback signal. A light feedback circuit 130 provides intensity command signals to the power supply 150 based on the optical feedback signal received via an optical feedback cable 132.

A temperature feedback circuit 136 provides temperature command signals to the power supply 150 based on a thermal feedback signal received via a second cable 134. The thermal feedback signal is preferably generated by means of a thermistor (not shown) mounted in the lamp housing 110 and driven by a current provided by driving transistors of the temperature feedback circuit 136. Optionally, the driving transistors (or even the entire temperature feedback circuit 136) may be mounted on the lamp housing.

Suitable temperature control circuitry to implement this aspect of the light source is commercially available from BHK, Inc. A power supply suitable for use as the power supply 150 of FIG. 1 is also known in the art and is commercially available from BHK, Inc. A conventional power supply 150 is provided with trim pots (i.e., variable resistors) for adjusting control parameters for the temperature control feedback loop and the light intensity feedback loop.

A digital display 140 indicates lamp status for visual inspection by users. The lamp status data provided to the digital display 140 is also provided as a DATA OUT signal for use as a process control signal. According to one alternate embodiment, the DATA OUT signal indicates merely whether the lamp is operating with nominal parameters or is in a failure mode (i.e., whether it is "ON" or "OFF"). At its simplest, the digital display 140 indicates only this basic ON/OFF information. According to another alternate embodiment, the DATA OUT signal includes information such as the intensity of the light source (according to the intensity command signals).

The embodiment illustrated in FIG. 1 provides control loops for both temperature and light intensity. Optionally, the temperature is left open loop and only the light intensity is controlled via feedback.

Figure 2:
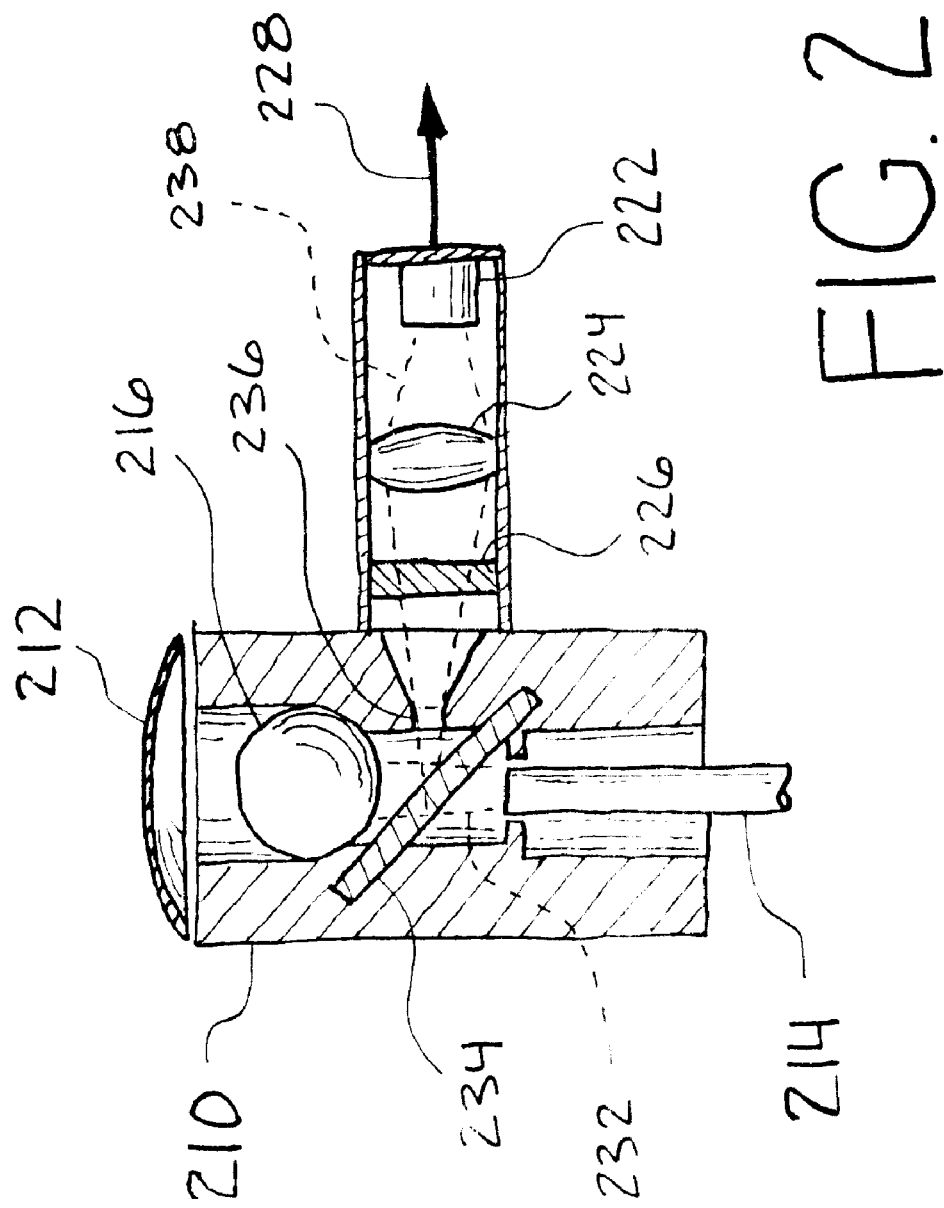
FIG. 2 illustrates a cross section detail view of a light source according to an embodiment of the present invention.

Referring to FIG. 2, a cross section detail view of a light source according to an embodiment of the present invention is illustrated. The solid machined housing block 210 securely holds a curved reflector 212, a vapor lamp 216, a beam splitter 234, and an optical fiber bundle 214. Although the reflector 212 is shown as being disposed atop the housing 210, the housing 210 may alternately extend upward to encompass the reflector 216. For clarity of illustration, the hardware for mounting the optical fiber bundle 214 in the housing 210 has been omitted. Such hardware is conventional, in any case, and is not essential to understanding of the invention.

A reference detector 222 measures a portion of the light generated by the lamp 216. The measured light is converged onto the reference detector 222 by a lens 224. A filter 226 limits the spectrum of light measured by the detector 222 to the spectral line of the output to be maintained stable (e.g., 254 nm, 365 nm).

A first optical path 232 is defined by the light that passes from the lamp 216 (either directly or indirectly via the reflector 212) to the fiber bundle 214. A small portion of the light in the first optical path 232 is reflected by a beam splitter 234 to establish a second optical path 238. A reference aperture 236 collimates the light in the second optical path 238. The diameter of the reference aperture 236 is chosen to provide the reference detector 222 with a numerical aperture (i.e., F/#) that is the same as the numerical aperture of the end face of the optical fiber bundle. The diameter of the reference aperture 236 is sized to be similar to the diameter of the fiber bundle 214 (or other, equivalent light guide) for matching light collection from the lamp (and any reflections, if present). The distance to the lens 224 and the aperture at the lens (defined by the diameter of the lens itself, its holder and mounting ring, or an intentional aperture placed near the lens (not shown in FIG. 2)) define the matching F/# to be close to that of the fiber bundle 214.

The strength of the converging lens 224 is selected to ensure that all the light passing through the reference aperture 236 is converged onto the reference detector 222.

The reference detector is a conventional component that may be obtained commercially from BHK, Inc.

Figure 3:
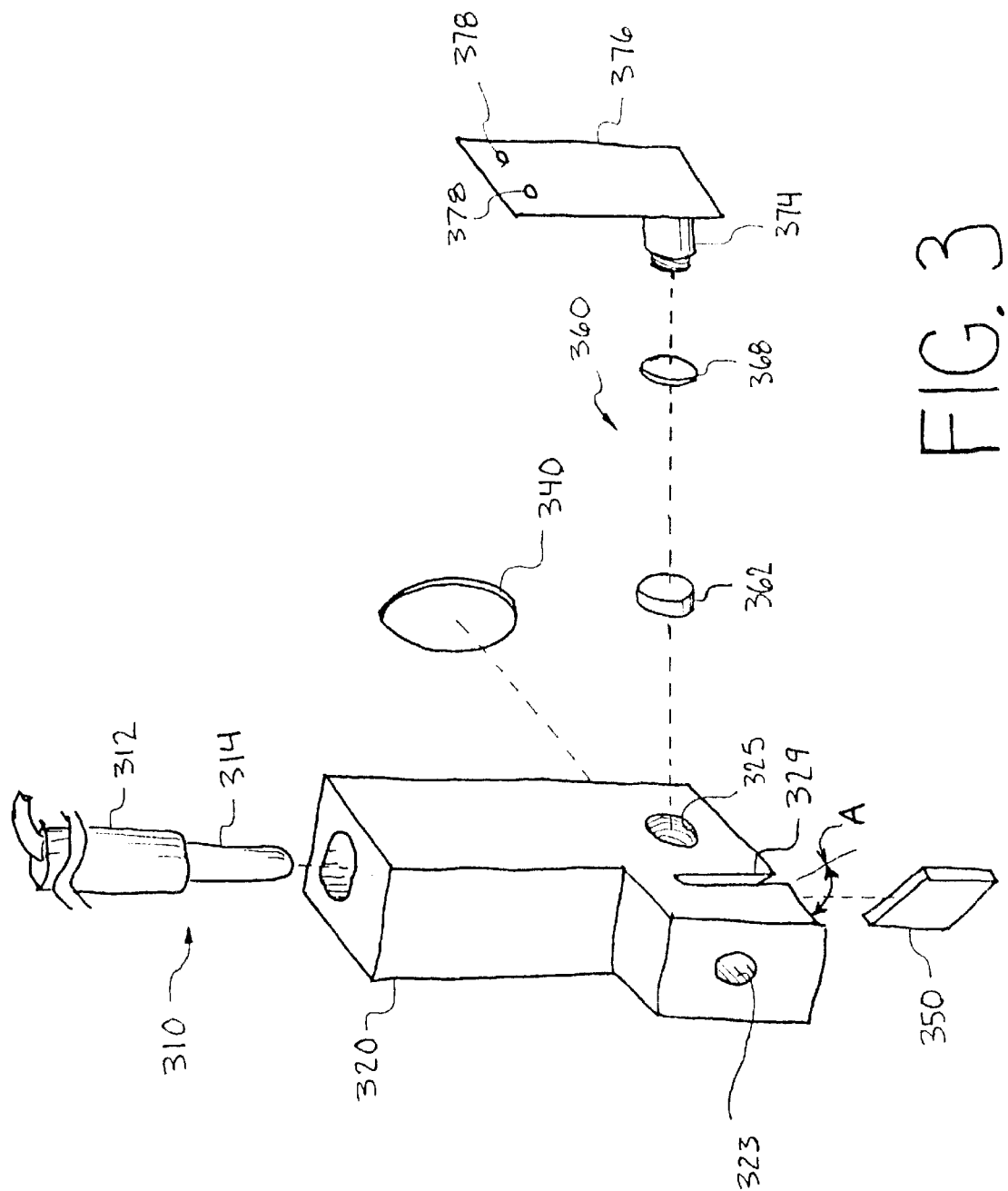
FIG. 3 illustrates an exploded view of a light source according to a preferred embodiment of the present invention.

Referring to FIG. 3, an exploded view of a light source according to a preferred embodiment of the present invention is illustrated. A vapor lamp 310 is inserted into the lamp housing 320. The bulb holder 312 of the vapor lamp 310 may be secured in place via any conventional fastening means, e.g., set screws. A reflector 340 is secured to the exterior of the lamp housing 320 in a position so as to reflect light radiated from the bulb 314 toward the aperture 323. Suitable structures for securing the reflector 340 to the housing 320 include a set of wide-lipped nylon spacers or cross straps fastened to the lamp housing by threaded fasteners. A beam splitter plate 350 is mounted in an angled slot 329 in the housing 320.

A measurement optics assembly 360 is mounted to the side of the lamp housing 320. A band pass filter 362 is spaced from the lamp housing 320. A focusing lens 368 is spaced from the band pass filter 362. An optical detector 374 is spaced from the focusing lens 368. The band pass filter 362, the focusing lens 368, and the optical detector 374 are aligned with one another and with an aperture 325 in the lamp housing 320, and are secured at their respective spacings via conventional housing structure (not shown for clarity).

According to this preferred embodiment, the optical detector 374 is mounted directly to a circuit board 376 on which an optical feedback circuit is disposed. Because the detector 374 is mounted directly on the circuit board 376, a cable such as the cable 132 shown in FIG. 1 is not necessary for this embodiment. Preferably the circuit board 376 is stabilized by a mounting bracket (not shown for clarity) that extends from the lamp housing 320 and fastens to the mounting holes 378. According to an alternate embodiment, the circuit board 376 is mounted remotely from the detector 374.

The angled slot 329 is machined at an angle A with respect to the housing 320 to direct a portion of the light from the vapor lamp 310 toward the measurement optics assembly 360. The angle A is preferably 45 degrees.

The beam splitter used according to the present invention is advantageously embodied as an uncoated quartz plate. Other materials providing the function of reflecting a small percentage of the subject light while transmitting the remainder would be suitable.

According to an alternate embodiment, a focusing reflector is substituted for the focusing lens. The focusing reflector option has the advantage of eliminating chromatic aberration whereas the focal length of a focusing lens is a function of wavelength. The focal length of the lens is a relevant consideration in generalizing the structure of a light source according to the present invention to be used at different wavelengths. By substituting a focusing reflector for the focusing lens described above, the geometry of the optical measurement assembly is made insensitive with respect to wavelength changes.

Other accommodations are possible to compensate for the phenomenon of chromatic aberration, aside from swapping the lens for a reflector. According to another alternate embodiment, the position of the detector with respect to the lens is changed as appropriate, depending upon the desired wavelength for the light source.

According to some additional alternate embodiments, the structure as disclosed above is modified to mitigate potential filter degradation caused by UV light and/or elevated temperature. In above described embodiments, the placement of the filters 226, 362 is primarily based on convenience without regard to degradation effects. There exists the possibility of filter degradation (reduction of transmission over time) due to either UV light from the lamp and/or elevated temperature (because the unitary block is heated). The temperature of the filter is reduced by thermally insulating the reference optics from the unitary block. There are a number of alternate embodiments to reduce or compensate for filter degradation caused by UV exposure.

According to one alternate embodiment, the filter is placed as closer to the lens as practicable, where the light is less concentrated.

According to another alternate embodiment, a neutral density filter is added upstream of the band pass filter (the gain on the feedback circuit being increased correspondingly). The neutral density filter is more resistant to UV-induced changes than many commercially available band pass filters are.

According to yet another alternate embodiment, another wavelength selection element is substituted in place of the band pass filter. A diffraction filter is preferred for this embodiment. Either an all-metal grating or a metal-on-substrate grating is acceptable. Another option, in lieu of a diffraction filter, is to replace the band pass filter with a transmissive binary optical device for wavelength selection.

According to still another alternate embodiment, long-term thermal drift of the band pass filter characteristic is simply compensated for by a secondary feedback path used as a reference check on a regular basis. Based on the check provided by the reference path, the gain of the primary feedback path is adjusted accordingly. The checks may be relatively infrequent (~once per shift) because the drift phenomenon, if present, is very slow. Importantly, any degradation of filter characteristic is certainly negligible over the few minutes period of time that each etch process step lasts.

Figure 4:
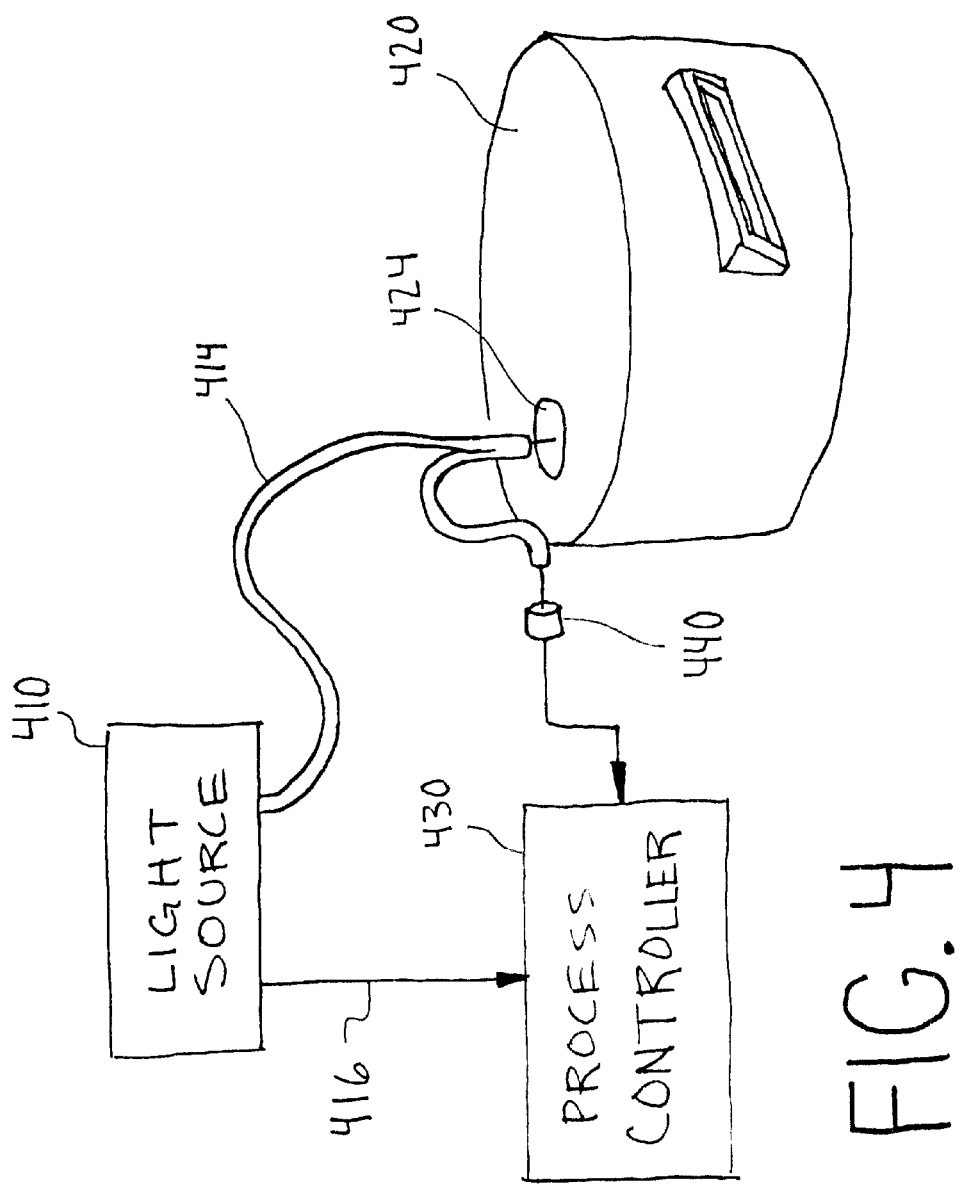
FIG. 4 illustrates a schematic view of a semiconductor processing system according to an embodiment of the present invention.

Referring to FIG. 4, a semiconductor processing system according to an embodiment of the present invention is illustrated. A light source 410 is combined with a process chamber 420 and a process controller 430. Light from the source 410 is coupled via an optical fiber bundle 414 to pass through a window 424 in the top of the chamber to impinge on the surface of wafer (not shown) being processed inside the chamber 420. Light reflected from the wafer back through the window 424 is directed to a light detector 440, which provides light intensity information to the process controller 430.

The process controller 430 also receives data from a data output node 416 of the light source that indicates whether the light source is in a failure mode. In the event a failure mode is indicated, the process controller 430 takes appropriate actions such as alerting the operator and/or modifying the process algorithm to use an alternate algorithm that is not dependent on accurate optical detection of the etch endpoint.

The combination of FIG. 4 is appropriate for use with a wide variety of process chambers. Light may be coupled through a window in an inductively coupled plasma chamber, such as the Decoupled Plasma Source (DPS) tool produced by Applied Materials, Inc. Light may also be coupled through a window in chamber that implements a magnetically confined plasma of the Magnetically Enhanced Reactive Ion Etch (MERIE) type, such as the MXP tool produced by Applied Materials, Inc. Light may also be coupled through a window in a chamber that implements parallel plate reactor of the Reactive Ion Etch (RIE) type. This is also applicable for use with deposition chambers.

The present invention has been described in terms of preferred embodiments, however, it will be appreciated that various modifications and improvements may be made to the described embodiments without departing from the scope of the invention.

What is claimed is:

1. A light source having a substantially constant output level, for use with a power supply that controls vapor lamp current according to a control signal, the light source comprising:
   a light guide having an end;
   a vapor lamp positioned near the end of the light guide;
   a beam splitter positioned along a first optical path extending between the vapor lamp and the end of the light guide; and
   a reference detector to receive a portion of the light output by the vapor lamp and generate a feedback signal for use as the control signal, the reference detector being positioned along a second optical path extending from the beam splitter angled away from the first optical path;
   wherein the end of the light guide has a predetermined numerical aperture, and wherein the second optical path is configured such that the reference detector receives light produced by the light source according to a numerical aperture that substantially coincides with the numerical aperture of the end of the light guide.

2. The light source of claim 1, wherein the light guide is an optical fiber bundle.

3. The light source of claim 1, wherein the vapor lamp is a mercury vapor lamp.

4. The light source of claim 1, further comprising:
a status display connected to indicate a light source status according to the feedback signal.

5. The light source of claim 1, further comprising:
a reflector positioned to concentrate light output by the vapor lamp into the end of the light guide.

6. A light source having a substantially constant output level, for use with a power supply that controls vapor lamp current according to a control signal, the light source comprising:
a light guide having an end;
a vapor lamp positioned near the end of the light guide;
a beam splitter positioned along a first optical path extending between the vapor lamp and the end of the light guide; and
a reference detector to receive a portion of the light output by the vapor lamp and generate a feedback signal for use as the control signal, the reference detector being positioned along a second optical path extending from the beam splitter angled away from the first optical path, wherein the second optical path is matched to the first optical path;
wherein the end of the light guide has a predetermined numerical aperture, and wherein the light source further comprises:
a reference aperture having a predetermined diameter, the reference aperture being disposed on the second optical path between the beam splitter and the reference detector; and
a converging lens having a predetermined strength, the converging lens being disposed on the second optical path between the reference aperture and the reference detector;
wherein the predetermined diameter and the predetermined strength are selected so as to match the second optical path to the first optical path by causing the second optical path to have a numerical aperture, at the reference detector, that substantially coincides with the numerical aperture of the end of the light guide.

7. The light source of claim 4, further comprising:
a data output node providing a signal indicating the light source status, wherein the light source status indicates whether the light source is in a failure mode.

8. A light source having a substantially constant output level, for use with a power supply that controls vapor lamp current according to a control signal, the light source comprising:
a unitary housing member having a light guide connection disposed at one end;
a light guide having an end, the end of the light guide being secured at the light guide connection;
a vapor lamp positioned securely via the unitary housing member;
a reflector positioned securely via the unitary housing member to concentrate light output by the vapor lamp into the end of the light guide;
a beam splitter positioned along a first optical path extending between the vapor lamp and the end of the light guide; and
a reference detector positioned to receive a portion of the light output by the vapor lamp and generate a feedback signal for use as the control signal, the reference detector being positioned along a second optical path extending from the beam splitter angled away from the first optical path;
wherein the end of the optical fiber bundle has a predetermined numerical aperture, and wherein the second optical path is configured such that the reference detector receives light produced by the light source according to a numerical aperture that substantially coincides with the numerical aperture of the end of the light guide.

9. The light source of claim 8, wherein the light guide is an optical fiber bundle.

10. The light source of claim 8, wherein the vapor lamp is a mercury vapor lamp.

11. The light source of claim 8, wherein the unitary housing member is machined as a single piece.

12. The light source of claim 8, further comprising:
a heat generating element in thermal communication with the unitary housing member;
a temperature sensor, in thermal communication with the unitary housing member, generating a temperature signal;
wherein the heat generating element is connected to receive power from the power supply in an amount controlled according to the temperature signal.

13. A light source having a substantially constant output level, for use with a power supply that controls vapor lamp current according to a control signal, the light source comprising:
a unitary housing member having a light guide connection disposed at one end;
a light guide having an end, the end of the light guide being secured at the light guide connection;
a vapor lamp positioned securely via the unitary housing member;
a reflector positioned securely via the unitary housing member to concentrate light output by the vapor lamp into the end of the light guide;
a beam splitter positioned along a first optical path extending between the vapor lamp and the end of the light guide; and
a reference detector positioned to receive a portion of the light output by the vapor lamp and generate a feedback signal for use as the control signal, the reference detector being positioned along a second optical path extending from the beam splitter angled away from the first optical path, wherein the first and second optical paths are matched to one another;
wherein the end of the light guide has a predetermined numerical aperture, and wherein the light source further comprises:
a reference aperture having a predetermined diameter, the reference aperture being disposed on the second optical path between the beam splitter and the reference detector; and
a converging lens having a predetermined strength, the converging lens being disposed on the second optical path between the reference aperture and the reference detector;
wherein the predetermined diameter and the predetermined strength are selected so as to match the second optical path to the first optical path by causing the second optical path to have a numerical aperture, at the reference detector, that substantially coincides with the numerical aperture of the end of the light guide.

14. A light source having a substantially constant output level, the light source comprising:
   a light guide having an end with a predetermined first numerical aperture;
   a vapor lamp;
   a reflector positioned to concentrate light output by the vapor lamp into the end of the light guide;
   a beam splitter positioned between the vapor lamp and the end of the light guide;
   means for stably securing the end of the light guide, the vapor lamp, the reflector, and the beam splitter in relation to one another along a first optical path;
   a reference detector positioned to receive a portion of the light output by the vapor lamp and generate a feedback signal, the reference detector being positioned along a second optical path extending from the beam splitter angled away from the first optical path, the second optical path having a predetermined second numerical aperture at the reference detector;
   means for establishing a fixed substantial match of the second numerical aperture to the first numerical aperture; and
   a power supply connected to supply power to the vapor lamp in an amount controlled according to the feedback signal.

15. The light source of claim 14, wherein the light guide is an optical fiber bundle.

16. A light source having a substantially constant output level, the light source comprising:
   an optical fiber bundle having an end;
   a vapor lamp positioned near the end of the optical fiber bundle;
   a reflector positioned to concentrate light output by the vapor lamp into the end of the optical fiber bundle via a first optical path;
   a beam splitter positioned along a first optical path extending between the vapor lamp and the end of the optical fiber bundle;
   a reference detector to receive a portion of the light output by the vapor lamp via a second optical path and generate a feedback signal;
   a power supply connected to supply power to the vapor lamp in an amount controlled according to the feedback signal; and
   a data output node providing a signal indicating a light source status according to the feedback signal, wherein the light source status indicates whether the light source is in a failure mode;
   wherein the first and second optical paths each have a fixed numerical aperture that are substantially the same value as one another.

17. A semiconductor processing system for use in executing steps for production of semiconductor devices, the system comprising:
   a process chamber in which a step for production of semiconductor devices are executed;
   a light source positioned to transmit a beam of light into the process chamber
   a process controller that controls the step; and
   a light detector positioned to receive light of said light source reflected out of the process chamber, wherein the light detector is connected to provide to the process controller a signal indicative of a parameter for control of the step;
   wherein the light source comprises:
      a light guide having an end;
      a vapor lamp positioned near the end of the light guide;
      a beam splitter positioned along a first optical path extending between the vapor lamp and the end of the light guide; and
      a reference detector to receive a portion of the light output by the vapor lamp and generate a feedback signal for use as the control signal, the reference detector being positioned along a second optical path extending from the beam splitter angled away from the first optical path;
      wherein the end of the light guide has a predetermined numerical aperture, and wherein the second optical path is configured such that the reference detector receives light produced by the light source according to a numerical aperture that substantially coincides with the numerical aperture of the end of the light guide.

18. A light source having a substantially constant output level, for use with a power supply that controls vapor lamp current according to a control signal, the light source comprising:
   a vapor lamp;
   a light guide having an end, the end of the light guide being positioned near the vapor lamp so as to receive light from the vapor lamp along a first optical path; and
   a reference detector positioned along a second optical path to receive a portion of the light output by the vapor lamp and generate a feedback signal for use as the control signal;
   wherein the end of the light guide has a predetermined numerical aperture, and wherein the second optical path is configured such that the reference detector receives light produced by the light source according to a numerical aperture that substantially coincides with the numerical aperture of the end of the light guide.

* * * * *